UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

TITANIFEROUS PRODUCTS AND METHOD OF PRODUCING THE SAME.

1,189,229.      Specification of Letters Patent.      Patented July 4, 1916.

No Drawing.      Application filed September 11, 1914. Serial No. 861,184.

*To all whom it may concern:*

Be it known that I, LOUIS E. BARTON, a citizen of the United States, and a resident of Niagara Falls, in the county of Niagara and State of New York, have invented certain new and useful Titaniferous Products and Method of Producing the Same, of which the following is a specification.

My present invention relates to titaniferous products, *i. e.* titanic concentrates, and their manufacture from matter containing titanic substances entangled with undesired materials; and its objects comprise provision of industrially practicable methods whereby are attainable such concentrates possessing novel useful properties, and from which is readily derivable a most highly concentrated titanic oxid product possessing novel, useful, qualities.

It is known that acid solutions of titanic oxid when diluted and heated, usually to boiling, yield precipitates of titanic acid. Such solutions, apparently of a colloidal nature, vary in stability, the hydrochloric acid solutions being far less stable than sulfuric acid solutions of the same concentration. This fact is utilized in chemical analysis for separation of titanium compounds from iron, or other therewith associated metallic substances, and also as a means for quantitative determination. For the latter it is necessary that the hydrochloric acid solution, of the impure titaniferous materials treated, be of low concentration, *i. e.* not to exceed 1% titanic oxid, or less, and free hydrochloric acid must be carefully neutralized until the solution is only slightly acid, the iron oxid present being invariably reduced to ferrous state as by sulfurous acid. On boiling such solutions meta-titanic acid is precipitated. This precipitate, often difficultly filtered, yields on calcination titanic oxid in the form of a gritty powder and still undesirably contaminated with iron oxid in proportion to presence of latter in the original charge. Such procedure is moreover industrially impracticable not only on account of the excessive dilution required, but, even more so, because of the difficulty and expense of preparing the hydrochloric acid solution of the titanic oxid, and moreover, because naturally-occurring forms of titanic oxid, as well as many of the manufactured products containing it, are practically insoluble in said acid so employed. It has, therefore, been necessary, in order to obtain even approximately satisfactory results, to preliminarily convert said usual forms of titanic oxid into new forms sufficiently soluble. Thus, for example, (1) the materials operated on, such, for instance, as titaniferous iron, or ilmenite, ores, have been fused with an acid flux such as sodium bisulfate and the resulting melt dissolved in acidulated water, thus obtaining a solution from which an acid-soluble titanic acid can be precipitated, as by alkali, and this soluble precipitate redissolved in hydrochloric acid, or, (2) the titaniferous materials have been fused with an alkaline flux, thus producing alkali-titanates which are soluble in an excess of acid. But, by my present invention, means are provided whereby a hydrochloric-acid-solution of titanic oxid is more cheaply, readily, and efficiently obtainable, thus rendering available, on industrial scales of production, the advantageous properties, for the purpose, of such solutions, and, moreover, there is thereby also producible, from such materials as above mentioned, a titanic acid product, and, also, therefrom a titanic oxid product, both of which I believe to contain less impurities than any hitherto attainable, and to possess also other novel and desirable characteristics.

I attain my said products by my novel process, as follows, viz:—I first obtain, in any convenient manner, a titanic sulfate solution. I can use any titaniferous material, which can be brought into sulfuric acid solution, as, for example, titaniferous iron ore, or ilmenite, dissolved in sulfuric acid, or first fused with alkali compounds and subsequently dissolved in sulfuric acid, but I prefer to use the dried, uncalcined, products resulting from either of the procedures jointly invented by Auguste J. Rossi and myself, on which were, on August 11th, 1914, granted U. S. Letters Patent Nos. 1,106,409 and 1,106,410, and for which is still pending our application Serial No. 840,197, filed May 22, 1914. By our said procedures the desired solution is, generally speaking, obtained by aid of melting titanic oxid together with sulfid of an alkali metal, or with sulfate of an alkali metal and carbon; lixiviating, or not, the resulting melts and boiling them in dilute sulfuric acid;— the resulting dried products consisting preponderatingly of titanic oxid in the form of soft, gray powder, their constituents being, as shown by analyses, variable within the following limits, viz:—

| | |
|---|---|
| Titanic oxid | 65 to 80% |
| Silica | 1 to 5% |
| Iron oxid | 1 to 7% |
| Soda | 2 to 15% |
| Sulfur (free) | 1 to 15% |
| Sulfuric anhydrid | $\frac{1}{10}$ to 1% |

Preferably such a titaniferous material, or titanic oxid concentrate, I digest at a temperature of 100° C. to 150° C. in an iron, or other refractory, vessel with 95% sulfuric acid in the proportion of 2.5 to 2.6 parts, by weight, of sulfuric acid to one part by weight of the titanic oxid. I continue the digestion until a sample taken from the digester shows, by analysis, a practically complete combination of the sulfuric acid with the bases. Under these conditions 85% to 95% of the titanic oxid of the charge will be combined with sulfuric acid as titanic sulfate. This mass of materials I then remove from the digester to a lead-lined, or other, refractory vessel and therein dissolve them in water the volume of which is about three times that of the sulfuric acid used in the charge. The resulting solution is of suitable concentration for filtration from any undissolved residue and of convenient volume for storage. To such a titanic sulfate solution having usually a specific gravity of about 1.40 and containing approximately 15% titanic oxid, I add, as a precipitating agent, a compound, as for example, any soluble salt capable of forming, by reaction with said solution, an insoluble sulfate. My researches, thus far, lead me to prefer, as such compound or salt, a chlorid of an alkali-earth, such as chlorid of barium; or, particularly, the chlorid of calcium not only on account of its relative cheapness, but also because of its superior fitness for the particular purpose of obtaining a hydrochloric acid solution of titanic oxid. The equation illustrative of the result attained, as for example, when calcium chlorid is thus employed, may be expressed as follows, viz:—

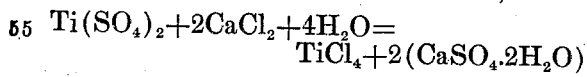

$$Ti(SO_4)_2 + 2CaCl_2 + 4H_2O = TiCl_4 + 2(CaSO_4.2H_2O)$$

I thus usually add to 140 parts by weight of such titanic sulfate solution a preferably saturated, solution of about 40 parts of calcium chlorid, the exact chemically equivalent quantity of this chlorid being calculated from the total sulfuric acid determined by analysis of the titanic sulfate solution. The mixing of the solutions and all subsequent operations therewith should, of course, be conducted in vessels refractory to hydrochloric acid, such as stoneware, for example.

As my calcium chlorid solution is more quickly made in hot water, it is convenient, though not essential, to mix the solutions warm, or hot.

The reaction above indicated is immediate. The resulting precipitate may be filtered out at once, or may be allowed to stand and settle for a few hours, or longer, if desired, but if not filtered promptly further heating should be avoided.

The precipitate is substantially pure hydrated calcium sulfate which, on washing with cold water, appears as a fine, white, powder useful for various purposes, and therefore as a valuable by-product of my process. Its yield is about 80% to 90% of the total obtainable by the reaction, the remainder being retained in solution. The filtrate from this calcium sulfate is a hydrochloric acid solution of titantic oxid containing as impurities chlorids of iron, sodium, etc. In practice, the volume of this filtrate will, owing to addition of the calcium chlorid solution and wash water, be found to be, usually, from two to two and a half times that of the titantic sulfate solution used. It will contain from 5.5% to 7% titantic oxid and is of suitable concentration for the next step of my process, though if more concentrated or slightly more diluted, it could be successfully used. This hydrochloric acid solution I next digest at preferably about 100° C. from five to eight hours, regulating approximately the required duration of digestion by withdrawing samples and roughly determining their titanic oxid content. The volume of the solution should be maintained as nearly constant as possible during the digestion, as can be conveniently done by conducting the operation in a closed vessel connected with a condenser by which all vapors are condensed and returned. During such digestion from 60% to 80% of the titanic oxid separates as a fine, white, precipitate, of hydrated titanic acid. Such precipitate, under the existing conditions, might be accounted for on the theory that the solution and precipitate are of a colloidal nature. Considered in the usual chemical terms it may be regarded as comprising a mixture of titanic acid, hydrated titanic chlorid, and hydrochloric acid, its components being in a state of unstable equilibrium, and, merely as indicating the results attained by its digestion, I assume the chemical reaction to take place in accordance with the equation:—

$$TiCl_4 + 4H_2O = TiO_2.2H_2O + 4HCl$$

During the digestion the free hydrochloric acid concentration of the solution is constantly increasing and, at the end of the operation (assuming an average of 70% yield of titanic acid) will be about 11%. It is notable that, under the conditions created by my method, this precipitation of titanic acid occurs in a comparatively concentrated solution and in presence of much free hydrochloric acid, the latter thus serving to hold in solution the above referred to impurities such as iron oxid and thereby contributing to the purity of the precipitate product.

The physical characteristics of the precipitate thus obtained are such as to permit of its being filtered out of the solution with exceptional ease. In this respect, as in others, it widely differs from the slimy precipitates usually obtained from hitherto employed highly dilute, nearly neutral, sulfur dioxid-reduced solutions. After filtering it out of the solution, I wash my said titanic acid precipitate with water, and dry it at about 100° C. It then appears as a soft, fine, white, powder, of specific gravity 2.75 to 2.80. It differs from naturally occurring as well as manufactured titanic oxids and acids, with which I am acquainted, in being much more readily and completely soluble in sulfuric acid, and also more easily and completely combinable with caustic, or carbonated, alkalis by fusion at relatively low temperatures. Its peculiar properties in these regards render it exceptionally useful as a substance from which to start in the preparation of other titaniferous products, as, for example, alkali titanates, alkali titanium oxalates, or other organic salts.

Repeated analyses of different samples of the said titanic acid products obtained by the practice of my aforesaid treatments demonstrate that their compositions vary, quite constantly, within substantially the following limits, viz:—

| | |
|---|---|
| Titanic oxid | 70.00 to 75.00% |
| Calcium sulfate | .00 to 1.00 |
| Iron oxid | Trace to .15 |
| Sulfuric anhydrid | .05 to .25 |
| Chlorin | Trace to .10 |
| Combined water | 25.00 to 30.00 |

From this the inference seems justified that my said product corresponds quite closely, if not exactly, with a titanic acid of definite chemical composition, expressible by a formula such as $TiO_2.2H_2O$.

The filtrate usually contains from 20% to 40% of the total titanic oxid treated and about 10% of free hydrochloric acid. This titanic content can be recovered as a crude titanic oxid by-product and again treated by my said process, or, if preferred, the filtrate and washings from the aforesaid primary titanic acid product, constituting a solution more dilute than the original, can again be further digested as before and a large part of this titantic by-product converted into a secondary titanic acid product which is, however, usually of a slightly inferior grade, being of a light cream color.

My present invention comprises the production, from my said novel titanic acid precipitate, of a titanic oxid concentrate product which is the purest and highest in percentage of titanic oxid of any known to me, and which possesses besides other novel and desirable characteristics. This I accomplish by calcining my said titanic acid product at, preferably, a red heat, say about 700° C., until analysis discloses that all volatile matter has been expelled, thus converting its titanic acid into titanic oxid. The specific gravity of this calcined product of my process is from 3.60 to 3.70. It is in the form of a very fine, soft, powder. Its color is whiter than that of any other commercial, calcined, titanic oxid product with which I am acquainted, and differs from pure white only in having an extremely faint tinge of lightest cream, imparted by its calcination. It contains less iron oxid than any such product with which I am acquainted, and it consists essentially of amorphous, i. e. non-crystalline, titanic oxid ($TiO_2$) chemically uncombined with any other substance.

Its unprecedented purity is evidenced by analyses of many samples thereof showing their respective compositions to be within the extremes stated about as follows, viz:—

| | |
|---|---|
| Titanic oxid | 98.25 to 99.75 |
| Iron oxid | Trace to .25 |
| Calcium sulfate | .00 to 1.50 |

It is also exceptionally useful for many purposes in various arts in proportion to its unprecedented purity, including, particularly, its freedom from iron compounds. It is, moreover, of such extreme and, I believe, unprecedented softness, fineness, and whiteness as, on these accounts also, to render it particularly desirable.

Having now described my invention, what I claim as new and desire to secure by Letters Patent is the following, viz:

1. In the treatment of a titaniferous material the steps which consist in digesting it with sulfuric acid; dissolving the resulting product in water; adding to the resulting solution a soluble salt capable of forming by reaction with said solution an insoluble sulfate; withdrawing the resulting sulfate precipitate, and digesting the remaining solution.

2. In the treatment of a titaniferous material the steps which consist in digesting it with sulfuric acid; dissolving the resulting product in water; adding to the resulting solution a soluble salt capable of forming by reaction with said solution an insoluble sulfate; withdrawing the resulting sulfate precipitate; digesting the remaining solution; filtering out the resulting titanic acid precipitate; and drying the same.

3. In the treatment of a titaniferous material the steps which consist in digesting it with sulfuric acid; dissolving the resulting product in water; adding to the resulting solution a soluble salt capable of forming by reaction with said solution an insoluble sulfate; withdrawing the resulting sulfate precipitate; digesting the remaining solution; filtering out the resulting titanic acid precipitate; washing the same, and drying the same.

4. In the treatment of a titaniferous material the steps which consist in digesting it with sulfuric acid; dissolving the resulting product in water; adding to the resulting solution chlorid of calcium; withdrawing the resulting sulfate precipitate, and digesting the remaining solution.

5. In the treatment of a titaniferous material the steps which consist in digesting it with sulfuric acid; dissolving the resulting product in water; adding to the resulting solution chlorid of calcium; withdrawing the resulting sulfate precipitate; digesting the remaining solution; filtering out the resulting titanic acid precipitate; and drying the same.

6. In the treatment of a titaniferous material the steps which consist in digesting it with sulfuric acid; dissolving the resulting product in water; adding to the resulting solution chlorid of calcium; withdrawing the resulting sulfate precipitate; digesting the remaining solution; filtering out the resulting titanic acid precipitate; washing the precipitate, and drying the same.

7. In the treatment of a titaniferous material the steps which consist in digesting it with sulfuric acid; dissolving the resulting product in water; adding to the resulting solution a soluble salt capable of forming by reaction with said solution an insoluble sulfate; withdrawing the resulting sulfate precipitate, and digesting the remaining solution at about 100° C.

8. In the treatment of a titaniferous material the steps which consist in digesting it with sulfuric acid; dissolving the resulting product in water; adding to the resulting solution a soluble salt capable of forming by reaction with said solution an insoluble sulfate; withdrawing the resulting sulfate precipitate, and digesting the remaining solution at about 100° C., filtering out the resulting titanic acid precipitate; and drying the same at about 100° C.

9. The method which comprises digesting a titanic material with sulfuric acid; dissolving the resulting product in water; adding to the resulting solution a soluble salt capable of forming by reaction with said solution an insoluble sulfate; withdrawing the resulting sulfate precipitate; digesting the remaining solution; filtering out the resulting titanic acid precipitate and calcining it.

10. The method which comprises digesting a titanic material with sulfuric acid; dissolving the resulting product in water; adding to the resulting solution chlorid of calcium; withdrawing the resulting sulfate precipitate; digesting the remaining solution; filtering out the resulting titanic acid precipitate and calcining it.

11. As a new article a fine, soft, powder of specific gravity from 3.60 to 3.70, in color white slightly tinged with faint cream, and containing traces, or not to exceed 0.25%, of iron oxid and from 98.25% to 99.75% of amorphous, white titanic oxid chemically uncombined with another substance.

12. As a new article a fine, soft, powder of specific gravity from 3.60 to 3.70, in color white slightly tinged with faint cream, consisting essentially of amorphous, white, titanic oxid chemically uncombined with another substance, and containing iron oxid.

13. As a new article a fine, soft, powder of specific gravity from 3.60 to 3.70, in color white slightly tinged with faint cream, consisting essentially of amorphous, white, titanic oxid chemically uncombined with another substance and containing not to exceed 0.25% of iron oxid.

14. As a new article a fine, soft, powder, in color white slightly tinged with faint cream, containing titanic oxid not less than 99.75%.

15. As a new article a fine, soft, powder, in color white slightly tinged with faint cream, containing titanic oxid not less than 99.75% and also iron oxid.

16. As a new article a fine, soft, powder, in color white slightly tinged with faint cream, consisting essentially of titanic oxid, and containing iron oxid and calcium sulfate.

17. As a new article a fine, soft, powder, in color white slightly tinged with faint cream, containing not less than 98% of titanic oxid, and also iron oxid and calcium sulfate.

LOUIS E. BARTON.

Witnesses:
Wm. V. Knowles,
Andrew Thompson.